(12) United States Patent
Koehler, Jr. et al.

(10) Patent No.: US 8,176,525 B2
(45) Date of Patent: May 8, 2012

(54) METHOD AND SYSTEM FOR TRUSTED CONTEXTUAL COMMUNICATIONS

(75) Inventors: Edwin Koehler, Jr., Ontario, NY (US); Cherif Sleiman, East Amherst, NY (US); Timothy Mendonca, Oldsmar, FL (US)

(73) Assignee: Rockstar Bidco, L.P., New York, NY (US)

( * ) Notice: Subject to any disclaimer, the term of this patent is extended or adjusted under 35 U.S.C. 154(b) by 970 days.

(21) Appl. No.: 11/540,272

(22) Filed: Sep. 29, 2006

(65) Prior Publication Data

US 2008/0083010 A1    Apr. 3, 2008

(51) Int. Cl.
*H04L 29/06* (2006.01)
(52) U.S. Cl. ............. 726/1; 726/2; 726/3; 726/4; 726/5; 726/6; 726/11; 726/12; 726/27; 713/155; 713/150; 709/223; 709/225; 370/254; 370/268; 370/351; 370/464; 370/465; 370/466
(58) Field of Classification Search .................. None
See application file for complete search history.

(56) References Cited

U.S. PATENT DOCUMENTS

| | | | |
|---|---|---|---|
| 7,103,667 B1 * | 9/2006 | Bell et al. ................ | 709/227 |
| 7,181,526 B1 * | 2/2007 | Bell et al. ................ | 709/231 |
| 7,467,142 B2 * | 12/2008 | Sinn et al. ................ | 1/1 |
| 7,555,774 B2 * | 6/2009 | Hall et al. ................ | 726/22 |
| 7,562,389 B1 * | 7/2009 | Goyal et al. .............. | 726/22 |
| 7,647,408 B2 * | 1/2010 | O'Neill .................... | 709/227 |
| 7,711,818 B2 * | 5/2010 | Lee et al. ................. | 709/225 |
| 7,802,174 B2 * | 9/2010 | Teng et al. ............... | 715/200 |
| 7,979,523 B2 * | 7/2011 | Ladd et al. ............... | 709/223 |
| 7,987,275 B2 * | 7/2011 | Shae et al. ............... | 709/227 |
| 8,010,997 B2 * | 8/2011 | Limont et al. ............ | 726/3 |

(Continued)

FOREIGN PATENT DOCUMENTS

EP    1143665 A2    10/2001

(Continued)

OTHER PUBLICATIONS

A SIP-based Architecture model for Contextual Coallition Access Control for Ubiquitous Computing, Mobiquitous (2005) by Ramiro Liscano, Kaining Wang. Proceedings of the Second Annual Conference on Mobile and Ubiquitous Systems (MobiQuitous '05). IEEE Computer.*

(Continued)

*Primary Examiner* — Syed A. Zia
(74) *Attorney, Agent, or Firm* — Christopher & Weisberg, P.A.

(57) ABSTRACT

This invention provides a method, system and apparatus for allowing media context sensitive SIP signaling exchange (such as voice) and call establishment while denying or challenging any other session description protocol ("SDP") extension dialogs which might not be desired (such as instant messaging, video, Web broadcasting or pushing, data and/or application sharing and the like) by a user. The method and apparatus may further include defining user client media policy preferences, the user media policy preferences establishing the parameters for evaluating a media session request received by a user client, and providing the user client media policy preferences to a policy enforcement point device, the policy enforcement point device evaluating the media session request received by the user client and applying the user client media policy preferences to the media session request. The method and apparatus may further include utilizing a user client portal to gain access to a media policy database, the media policy database providing storage for user client media policy preferences.

20 Claims, 8 Drawing Sheets

U.S. PATENT DOCUMENTS

| | | | |
|---|---|---|---|
| 8,050,255 B2 * | 11/2011 | Sidhu et al. | 370/353 |
| 8,090,847 B2 * | 1/2012 | Dopson et al. | 709/228 |
| 2002/0036983 A1 | 3/2002 | Widegren et al. | |
| 2002/0166049 A1 * | 11/2002 | Sinn | 713/175 |
| 2003/0074580 A1 * | 4/2003 | Knouse et al. | 713/201 |
| 2005/0015490 A1 * | 1/2005 | Saare et al. | 709/225 |
| 2005/0071643 A1 * | 3/2005 | Moghe | 713/182 |
| 2005/0071644 A1 * | 3/2005 | Moghe et al. | 713/182 |
| 2005/0258238 A1 * | 11/2005 | Chapman | 235/380 |
| 2006/0074894 A1 * | 4/2006 | Remahl et al. | 707/4 |
| 2006/0101511 A1 * | 5/2006 | Faillenot et al. | 726/13 |
| 2006/0200477 A1 * | 9/2006 | Barrenechea | 707/100 |
| 2007/0044144 A1 * | 2/2007 | Knouse et al. | 726/8 |
| 2007/0233531 A1 * | 10/2007 | McMahon | 705/7 |
| 2007/0263607 A1 * | 11/2007 | Milstein et al. | 370/356 |
| 2007/0280225 A1 * | 12/2007 | Forbes et al. | 370/389 |
| 2008/0003941 A1 * | 1/2008 | Milstein et al. | 455/3.01 |
| 2008/0205267 A1 * | 8/2008 | El Barachi et al. | 370/230 |
| 2010/0220716 A1 * | 9/2010 | O'Neill | 370/352 |

FOREIGN PATENT DOCUMENTS

| | | |
|---|---|---|
| EP | 1701511 A1 | 9/2006 |
| WO | 2007078351 A2 | 7/2007 |

OTHER PUBLICATIONS

"Digital Cellular Telecommunications System (Phase 2+); Universal Mobile Telecommunications System (UMTS); IP Multimedia Subsystem (IMS); Stage 2 (3GPP TS 23.228 v. 7.4.0 Release 7); ETSI TS 123 228", ETSI Standards, European Telecommunications Standards Institute, Sophia-Antipo, FR, vol. 3-SA2, No. V740, (Jun. 2006), XP014035471 ISSN: 0000-0001.

* cited by examiner

METHOD AND SYSTEM FOR TRUSTED CONTEXTUAL COMMUNICATIONS

CROSS-REFERENCE TO RELATED APPLICATION n/a

STATEMENT REGARDING FEDERALLY SPONSORED RESEARCH OR DEVELOPMENT n/a.

FIELD OF THE INVENTION

The present invention relates to communication networks, and more particularly to a method, system and apparatus that provides for contextual control of inter-human communication.

BACKGROUND OF THE INVENTION

The traditional public switched telephone network ("PSTN") operates on an anonymous calling paradigm. The only requirement is the knowledge and use of a phone number to establish a request (ring) for communications. This means that as long as a caller knows the telephone number of the receiver, that caller can ring the receiver in an attempt to establish audio communications with that receiver. There are many benefits to this model that are well attested by the success of the PSTN today. Next generation Internet Protocol ("IP") based communications technologies, unlike the PSTN, are developed under an open system environment rooted in the Internet-centric paradigm. Accordingly, the Internet-centric paradigm is not anonymous, but instead demands identification and authorization of the caller. Session Initiation Protocol ("SIP") allows for full session establishment and management but requires a degree of trust that is not typically available in the enterprise or provider network. SIP is a proposed standard that may be used to initiate, modify, and terminate an interactive user session that involves multimedia elements, such as voice (audio), video, instant messaging, online games and virtual reality. In particular, SIP provides a signaling and call setup protocol for IP-based communications that can support a superset of the call processing functions and features present in the PSTN. The SIP protocol by itself does not define these features, but instead, focuses on call setup and signaling. The SIP protocol does, however, enable the building of the PSTN features in network elements known as proxy servers and user agents.

A user agent is the client application used with a particular network protocol; the phrase is most commonly used in reference to those which access the World Wide Web ("WWW"). Web user agents range from web browsers to search engine crawlers, as well as mobile phones, screen readers and Braille browsers used by people with disabilities. When Internet users visit a web site, a text string is generally sent to identify the user agent to the server. This text string forms part of the hypertext transfer protocol ("HTTP") request, prefixed with user-agent and typically includes information such as the application name, version, host operating system, and language. Internet bots, such as web crawlers, often also include a uniform resource locator ("URL") and/or e-mail address so that the webmaster can contact the operator of the bot. A bot is a common phrase on the Internet for a software program that is a software agent. A bot interacts with other network services intended for people as if it were a person and typically it is used to gather information.

A proxy server is a computer that offers a computer network service to allow clients to make indirect network connections to other network services. A client connects to the proxy server, then requests a connection, file, or other resource available on a different server. The proxy server provides the resource either by connecting to the specified server or by serving it from its memory cache.

The SIP protocol acts in concert with several other protocols and is only involved in the signaling portion of a communication session. SIP acts as a carrier for the session description protocol ("SDP"), which describes the media content of the session, e.g. what IP ports to use, the codec being used, the specific media format, etc. In typical use, SIP "sessions" are packet streams of the Real-time Transport Protocol ("RTP") where RTP is the carrier for the actual voice or video content itself.

As multimedia collaborative communications emerge as commonplace, a result of Internet-centric protocols and mobility technologies, it is desirable to have a system or mechanism that can provide the function of the anonymous calling capabilities available to the legacy PSTN circuit switched environment. In addition, there should be a method for filtering against contextual media types.

One approach to provide security and to establish inter-domain trust on a session-by-session basis is defined by the work of the Internet Engineering Task Force ("IETF") on the use of Certificate Authorities. A Certificate Authority is an entity, which issues digital certificates for use by other parties, and is an example of a trusted third party. A Certificate Authority will issue a public key certificate that attests that the public key contained in the certificate belongs to the person, organization, server, or other entity noted in the certificate. A Certificate Authority's obligation in such schemes is to verify an applicant's credentials, so that users (e.g., relying parties) can trust the information in the Certificate Authority's certificates. This approach however requires many predefined logistics and systems that are complex to administer and may hinder the mobility and portability of calls; moreover, they are simply not available or practical in a typical anonymous model. There are also questions of scalability given the number of PSTN calls that occur daily on an anonymous basis.

What is desired is an arrangement under which trusted peer-to-peer SIP (or any similar multimedia protocol) communications can be provided against contextual media types for media session calls where users have complete control over the who, the where, the when and the how of the media session.

SUMMARY OF THE INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

This invention provides a method, system and apparatus for allowing media context sensitive SIP signaling exchange (such as voice) and call establishment while denying or challenging any other session description protocol ("SDP") extension dialogs which might not be desired (such as instant messaging, video, Web broadcasting or pushing, data and/or application sharing and the like) by a user. The method and apparatus may further include defining user client media policy preferences, the user media policy preferences establishing the parameters for evaluating a media session request received by a user client, and providing the user client media policy preferences to a policy enforcement point device, the policy enforcement point device evaluating the media session request received by the user client and applying the user client media policy preferences to the media session request. The method and apparatus may further include utilizing a user client portal to gain access to a media policy database, the media policy database providing storage for user client media policy preferences.

In accordance with one aspect, the present invention provides method for providing trusted contextual communications, by defining user client media policy preferences, the user media policy preferences establishing the parameters for evaluating a media session request received by a user client, and providing the user client media policy preferences to a policy enforcement point device, the policy enforcement point device evaluating the media session request received by the user client and applying the user client media policy preferences to the media session request. The method may further include utilizing a user client portal to gain access to a media policy database, the media policy database providing storage for the user client media policy preferences. The method may further include validating the user client media policy preferences and storing the user client media policy preferences. The method may yet further include receiving an incoming media session request for the user client.

In accordance with another aspect, the present invention provides a system for providing trusted contextual communications in a communication network. The system for a providing trusted contextual communications in a communication network having a user client portal, the user client portal providing access to system media session policy preferences, a policy decision function module, the policy decision function module providing identity management and media session policy modification to the trusted contextual communications system, and a domain trust table, the domain trust table storing media session policy preferences. The apparatus may further include a policy enforcement point, the policy enforcement point device applying the media session policy preferences upon receipt of a media session request. The apparatus may further include a session initiation protocol proxy device, the session initiation protocol proxy device capable of establishing connections between a first user client and a second user client.

In accordance with yet another aspect, the present invention provides storage medium storing a computer program which when executed by a processing unit performs a method for providing trusted contextual communications on a communication network, the method comprising by defining user client media policy preferences, the user media policy preferences establishing the parameters for evaluating a media session request received by a user client, and providing the user client media policy preferences to a policy enforcement point device, the policy enforcement point device evaluating the media session request received by the user client and applying the user client media policy preferences to the media session request. The method may further include utilizing a user client portal to gain access to a media policy database, the media policy database providing storage for the user client media policy preferences. The method may further include validating the user client media policy preferences and storing the user client media policy preferences.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

This invention provides a method, system and apparatus for allowing media context sensitive SIP signaling exchange (such as voice) and call establishment while denying or challenging any other session description protocol ("SDP") extension dialogs which might not be desired (such as instant messaging, video, Web broadcasting or pushing, data and/or application sharing and the like) by a user. In other words, since inter-human communications are a rather personal matter, a user should decide or modify the permissible media and session types that a calling party is allowed to make to that user. Accordingly, this invention allows for the establishment of trusted peer-to-peer SIP communications by allowing only session and media establishment that has been specified as permissible by the user. Consequently, additional media session calls would require authorization either from the called party or from the session management systems to allow for the establishment of the additional media session calls.

Figure 1:
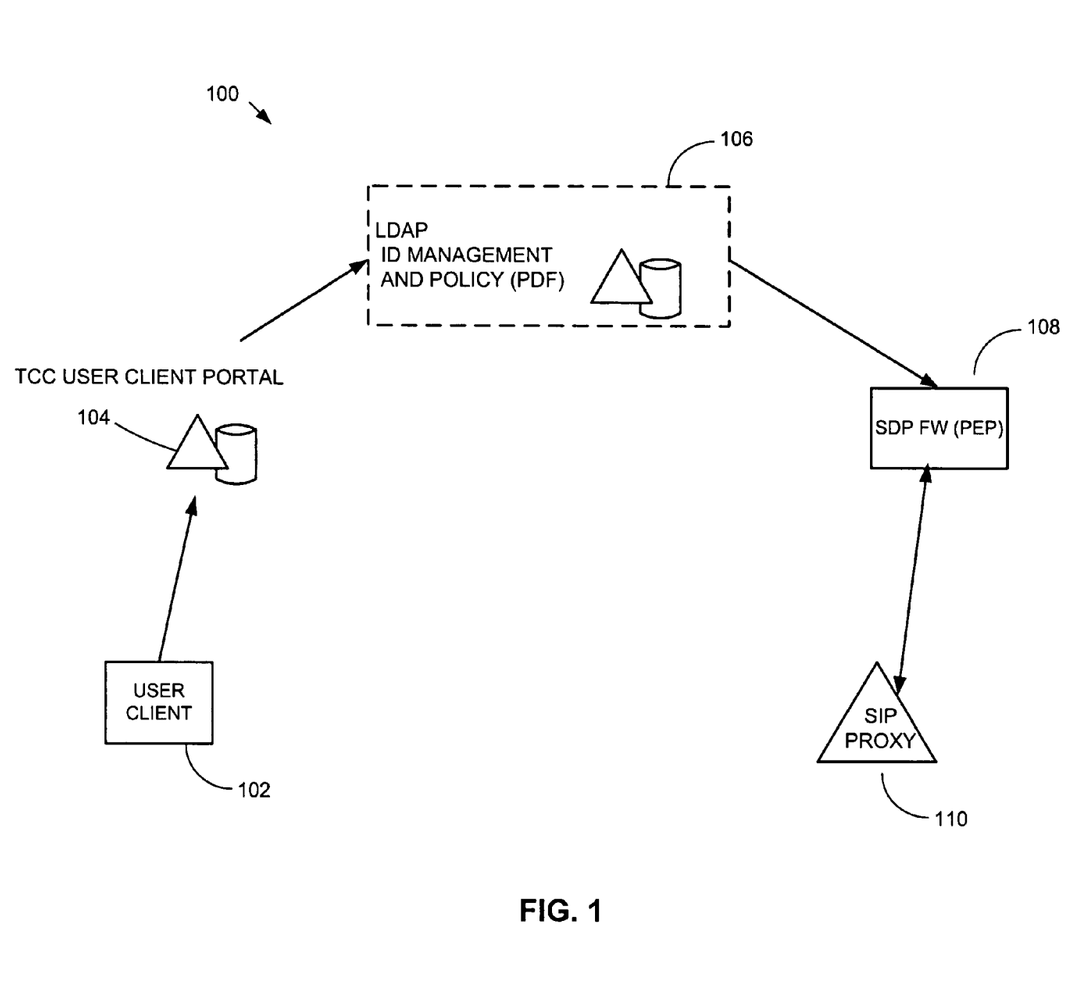
FIG. 1 is a block diagram of a trusted contextual communication system of an embodiment of the present invention.

Referring now to the drawing figures in which like reference designators refer to like elements, there is shown in FIG. 1, a block diagram of the basic architecture of a trusted contextual communications ("TCC") system in accordance with the principles of the present invention and designated generally as "100". The TCC system 100 comprises a user client portal 104, a policy decision function ("PDF") 106, a policy enforcement point ("PEP") 108 and a SIP proxy 110. In general, a user client 102 is a computer system that accesses a (remote) service on another computer using some kind of network. As used herein the term "user client" is meant to include a wide range of computer-based systems, including but not limited to personal computers, SIP-based phones, mobile phones, personal data assistants ("PDA") and like devices, which use the SIP protocol or a similar protocol in a network environment.

The user client portal 104 provides a user client 102 with the option to modify the allowable media and session types at the appropriate level. For example, the user client 102 may modify the policies at the domain, group or user specific levels conditioned upon allowance by a central administrative policy manager, also known as a service administrator. The modified policies may dictate, for example, that at the domain level, only voice media is permissible (which could be the domain level default); at the group level, voice, video and instant messaging media is permissible; while at the user level, in addition to all group level media being permissible, web push or forcing and data collaboration are also permissible. These modified user policies can be stored in a corresponding media policy database ("MPD") that may be viewed as a specialized form of a security policy database ("SPD"), which stores the security policy of a network. In general, a security policy is a plan of action for tackling security issues, or a set of regulations for maintaining a certain level of security in a network. A security policy typically may be a high level document that states management commitment and intent in relation to information security. A security policy may contain a company or an entity's definition of information security and is supported by other policies (sub-policies), information security objectives, procedures and other documents (e.g., references made to these documents).

In a similar way, the MPD stores the media policies that are to be applied to the media and session types that are to be permissible to user clients and their corresponding session callers. These media policies are "pushed" or provided to the identification management ("IdM") and policy PDF 106 for approval and validation, and storage in the central policy repository that may include a domain trust table. The terms "push", "pushes", "pushing" and "pushed" are used herein to broadly refer to a set of actions ranging from making data and information available to a module, user, client, entity, network, subnetwork, device, apparatus, system, subsystem or the like, to forcing or commanding that data or information be presented, used, followed, obeyed, accessed, and the like. For example, in webpage pushing, a caller may try to force a webpage to appear on a user client's communication device during a media session. Similarly, in IM pushing, a caller may try to force an IM window popup (appear) on a user client's communication device during a media session. Upon system validation and approval, the user level MPD modifications are "pushed" or provided to the PEP 108 (e.g., SDP firewall function).

In this embodiment, the PDF 106 comprises the lightweight directory access protocol ("LDAP"), and the IdM and policy features. The LDAP is a networking protocol for querying and modifying directory services running over transmission control protocol/internet protocol ("TCP/IP"). The PDF 106 provides the user level MPD policy modifications to the SDP firewall (PEP) 108. In addition, the PDF 106 provides the application and network level identification and authentication functions for the system 100.

A firewall is generally defined as a piece of hardware and/or software that functions in a networked environment to prevent some communications forbidden by a security policy. A firewall may sometimes be referred to as a border protection device ("BPD") or packet filter and it has the basic task of controlling traffic between different zones of trust. These typical zones of trust include the Internet (which is a zone with no trust) and an internal network (which is a zone with high trust). The ultimate goal is to provide controlled connectivity between zones of differing trust levels through the enforcement of a security policy and connectivity model based on the least privilege principle. In this example, the user level MPD policy modifications are applied by the SDP firewall 108 on a call by call basis. This configuration of PDF 106 and SDP firewall (PEP) 108 may be referred to as a "provisioning model". In this model, the SDP firewall (PEP) 108 reports its decision-making capabilities to the PDF 108. The PDF 108 then downloads relevant policies to the SDP firewall (PEP) 108, which in turn can make its own decisions of which media sessions may proceed based on these policies. Alternatively, an "outsourcing model" may be used where the policies are stored on the PDF 106 and whenever the SDP firewall (PEP) 108 needs to make a decision, it sends all relevant information to the PDF 106. The PDF 106 analyzes the information, makes a decision and relays it to the SDP firewall (PEP) 108. The SDP firewall (PEP) 108 can then simply enforce that decision.

Continuing to refer to FIG. 1, the system 100 also includes a SIP proxy 110. The SIP proxy 110 functions much like a "soft" private branch exchange ("PBX") in an IP network in that it establishes connections (circuits) between the communication devices (e.g., IP telephone sets) of two users, maintains such connections as long as the users require them (e.g., channeling voice signals between the users), and provides information for accounting purposes (e.g., metering call sessions).

The trusted contextual communications of the present invention scales by analyzing the session request via the serving signaling proxy 110 or accelerated SDP firewall 108. In incidents where there is established trust within a domain, then an extended anonymous trust model outside of that domain will be available for specifically allowed session requests. It should be noted that the trusted contextual communications invention may be used in cooperation with external certificate authorities to enhance the end-to-end trust model.

Figure 2:
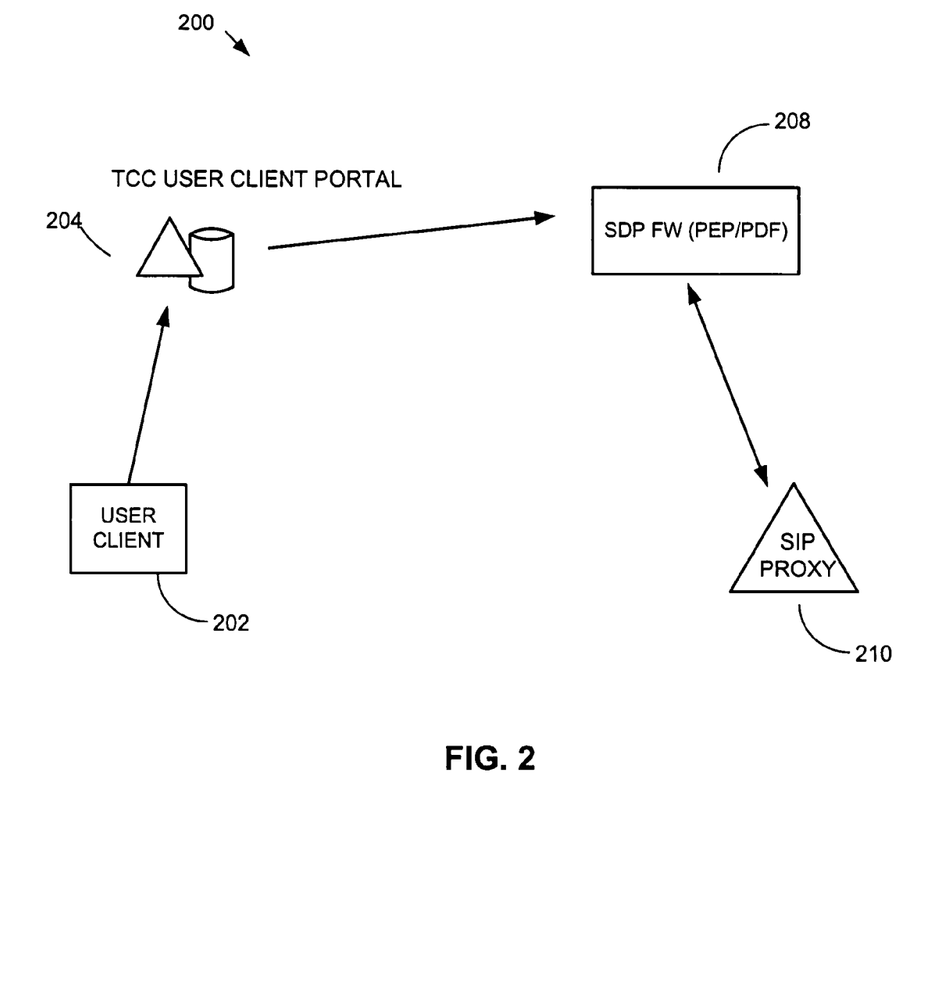
FIG. 2 is a block diagram of a trusted contextual communication system of another embodiment of the present invention.

FIG. 2 illustrates a block diagram of the basic architecture of a trusted contextual communications ("TCC") system 200 in accordance with another embodiment of the present invention. In this embodiment, the TCC system 200 is not coupled to a PDF 106, but instead merges the PDF functionality into PEP 208. Accordingly, the TCC system 200 comprises a user client portal 204, a PEP/PDF 208 and a SIP proxy 210. The user client portal 204 provides a user client 202 with the option to modify the allowed media and session types at the appropriate level. The components of TCC system 200 are similar to the components of TCC system 100 with the exception of the merger of PEP and PDF functions into PEP/PDF 208 and the storage of the user and corresponding MPD policies in the SIP firewall policy base. As this embodiment does not include the identification management (IdM) framework of system 100, the SIP proxy 210 will be responsible for handling the identification and authentication functions.

Figure 3:
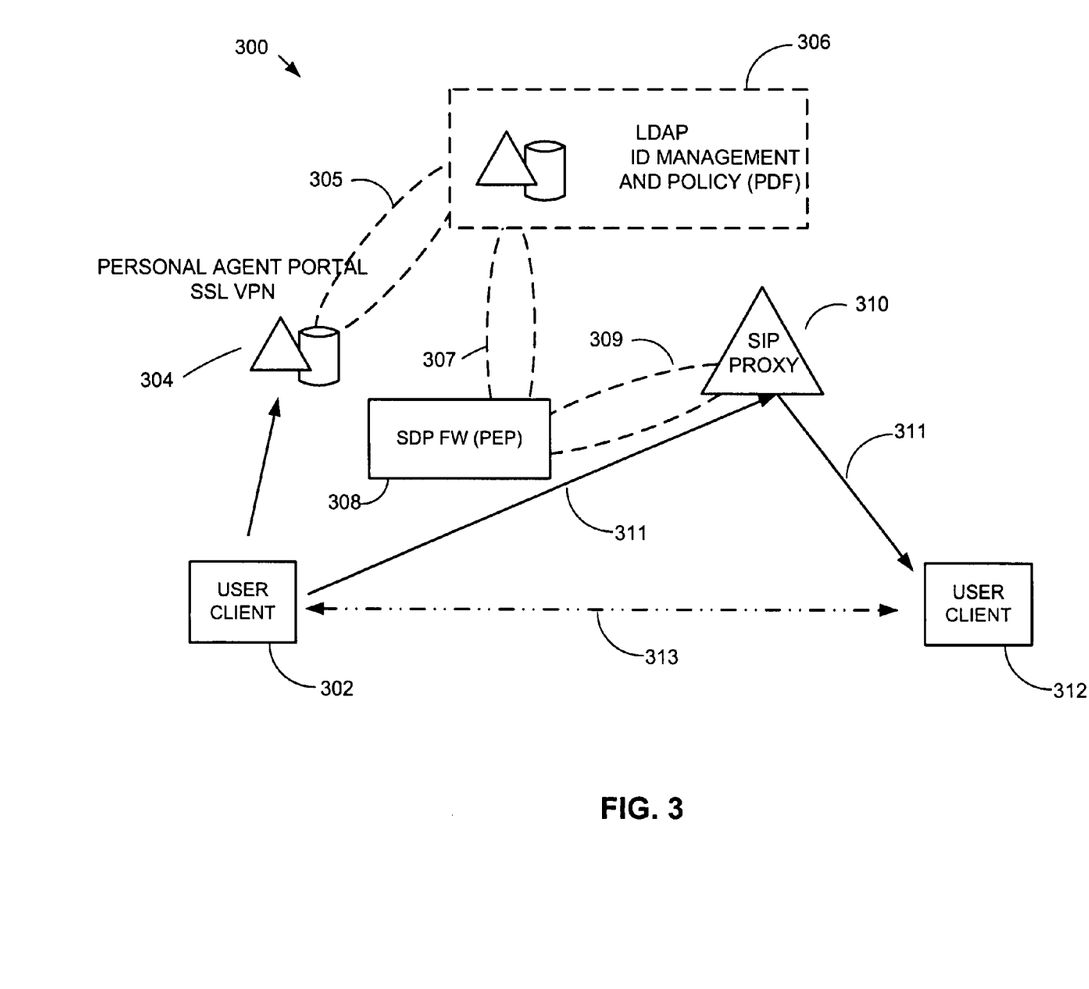
FIG. 3 is a block diagram of a trusted contextual communication system within an enterprise or hosted environment of another embodiment of the present invention.

FIG. 3 illustrates a block diagram of the trusted contextual communications ("TCC") system 300 deployed within an enterprise or hosted environment (e.g., FOO.com). In this embodiment, the TCC system 300 includes a user client portal/secure sockets layer ("SSL") virtual private network ("VPN")) 304, a PDF 306, a PEP 308 and a SIP proxy 310. The SSL is used to provide privacy and integrity of the user client portal 304, and thus secure against an unauthorized entity gaining access or control over the user client portal 304. In this embodiment the functionality of user client portal 304, PDF 306, PEP 308 and SIP proxy 310 corresponds to the functionality of user client portal 104, PDF 106, PEP 108 and SIP proxy 110 as previously discussed with respect to FIG. 1. In this embodiment, the TCC system 300 further includes various communication links 305, 307, 309 and 311, which provide signaling and SDP interrogation among the user client portal 304, the PDF 306, the PEP 308, the SIP proxy 310 and the user clients 302 and 312, and communication link 313 for a default media type (e.g., audio only) selected by the user client 302. Therefore in this embodiment, the TCC system 300 would permit anonymous inter-domain audio communications equivalent to the PSTN model. The communication link 305 permits the user client 302 to utilize the user client portal 304 to push or provide the user client media session preferences to the PDF 306. PDF 306 in turn uses communication link 307 to push the user client media session preferences, once approved by the central administrative policy manager, to the SDP firewall (PEP) 308. The SIP proxy 310 references the user client media session preferences of SDP firewall (PEP) 308, and determines whether a requested media session is permissible for the caller. In this way, the communication links 311 provide for the signaling and SDP interrogation data to flow among the user client 302, SIP proxy 310 and caller (user client 312). When caller (user client 312) has its trust established, then the media session will include, at the least, the default media type selected by user client 302. In addition, specific domains of caller (user client 312) may be enabled for further anonymous trust such as instant messaging ("IM") and video.

Figure 4:
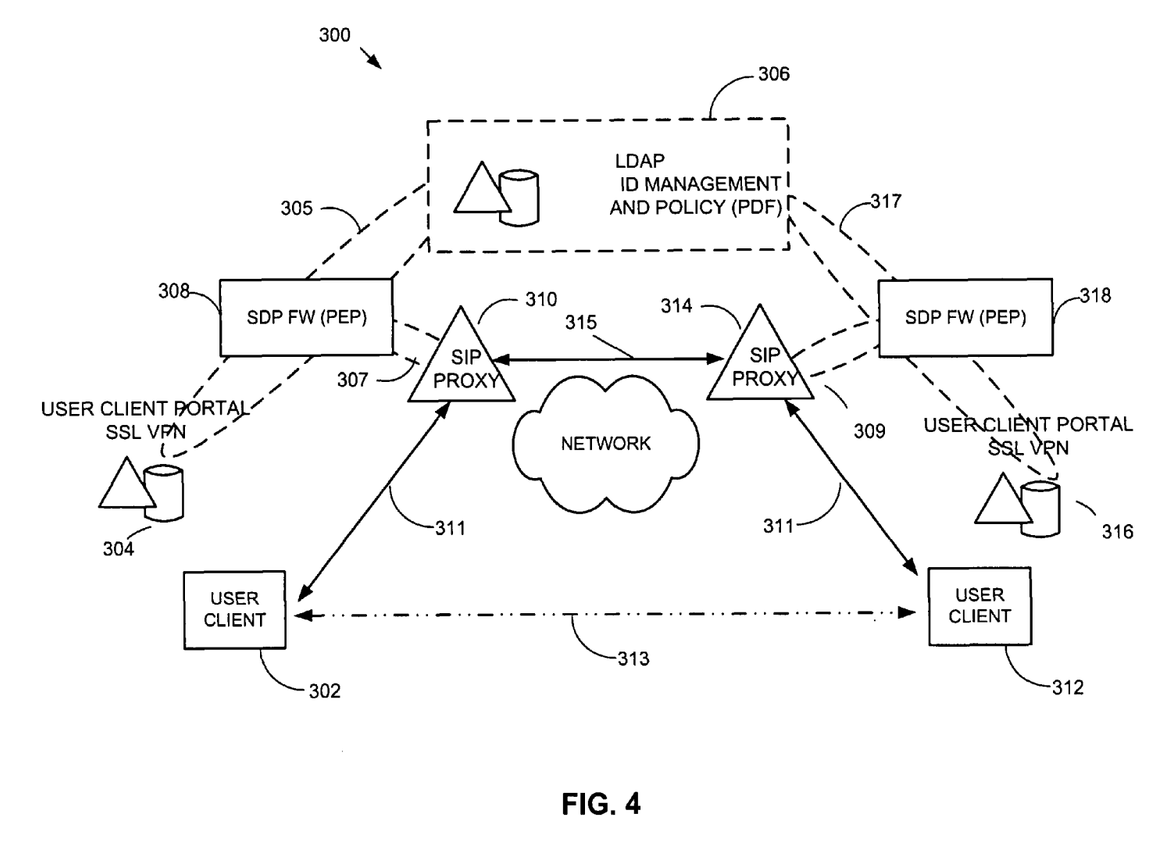
FIG. 4 is a block diagram of a trusted contextual communication system spanning SIP domains within a common IdM and Policy domain of another embodiment of the present invention.

FIG. 4 illustrates another embodiment of the trusted contextual communications ("TCC") system 300 spanning SIP domains within a common IdM and Policy domain. For example, SIP proxy 310 could be FOO.com and have a sister domain called FOOFOO.com (SIP proxy 314). Although each SIP domain would likely have its own SDP firewall (PEP) 308, 318, the SIP domains could share a common IdM and Policy domain (PDF) 306. In this embodiment, the TCC system 300 includes user client portals 304 and 316, a PDF 306, PEPs 308 and 318, and SIP proxies 310 and 314. In this embodiment, the functionality of user client portal 304, PDF 306, PEP 308 and SIP proxies 310 and 314 corresponds to the functionality of user client portal 104, PDF 106, PEP 108 and SIP proxy 110 as previously discussed with respect to FIG. 1. In this embodiment, the TCC system 300 further includes various communication links 305, 307, 309, 311 and 315, which provide signaling and SDP interrogation among the user client portals 304 and 316, the PDF 306, PEPs 308 and 318, and SIP proxies 310 and 314 and the user clients 302 and 312, and communication link 313 for a default media type (e.g., audio only) selected by the user client 302 or user client 312. The functionality of communication links 305, 307, 309, 311 and 313 corresponds to the functionality of communication links 305, 307, 309, 311 and 313 as previously discussed with respect to FIG. 3. In this embodiment, another communication link 315 provides for signaling and SDP interrogation between SIP proxies 310 and 314 (e.g., domains "FOO.com" and "FOOFOO.com"). This example also illustrates that the user client portals 304, 316 implicitly control the SDP firewalls 308 and 318 via the dialog with PDF 306.

Figure 5:
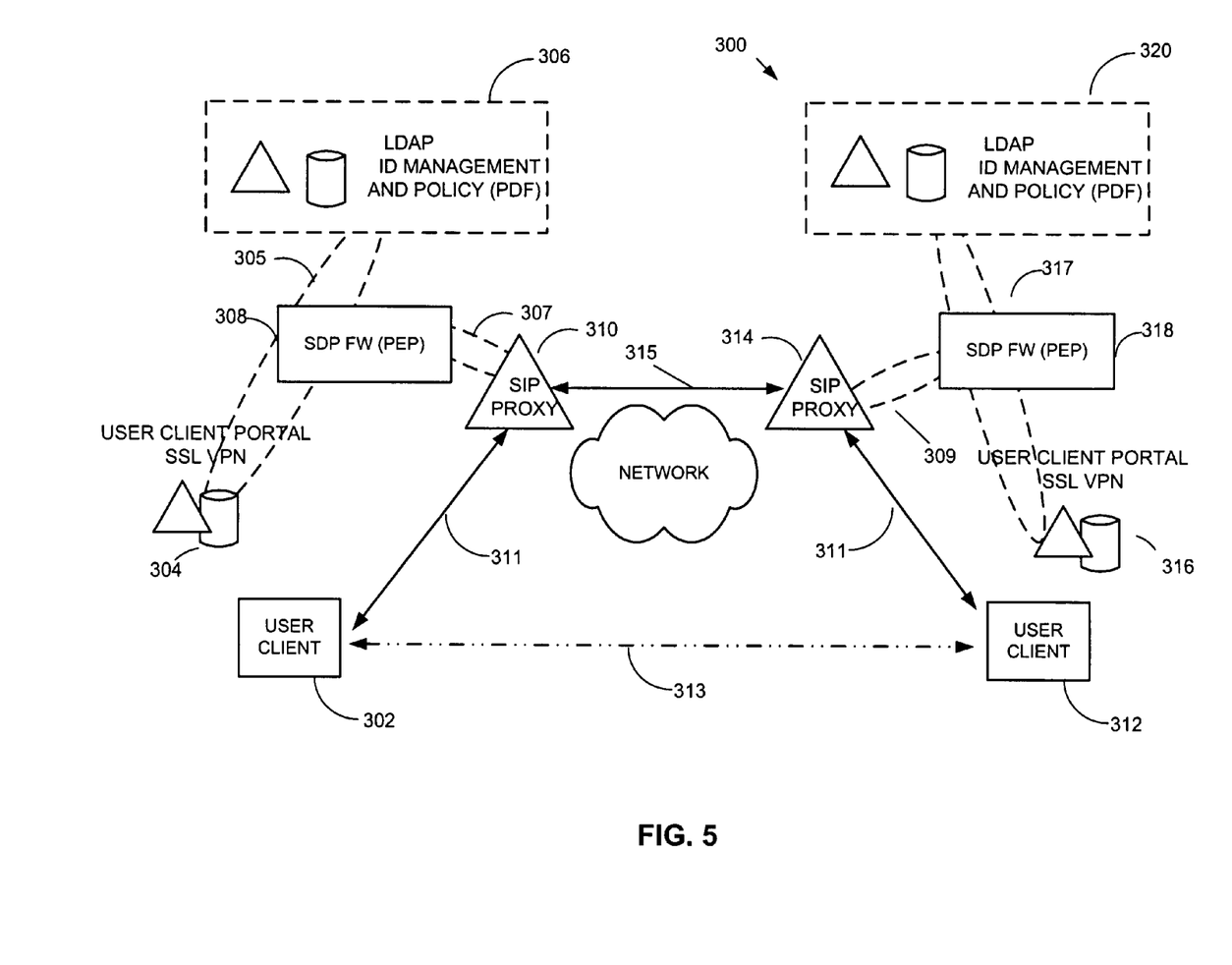
FIG. 5 is a block diagram of a trusted contextual communication system spanning SIP domains between two IdM and Policy domains of another embodiment of the present invention.

FIG. 5 illustrates another embodiment of the trusted contextual communications ("TCC") system 300 spanning SIP domains 310 and 314 between two IdM and Policy domains 306 and 320. For example, SIP proxy 310 could be FOO.com and SIP proxy 314 could be XYZ.com, a separate entity from FOO.com. Accordingly, not only would each SIP domain likely have its own SDP firewall (PEP) 308, 318, the SIP domains would most like have individual IdM and Policy domains (PDF) 306 and 230. In this embodiment, the TCC system 300 includes user client portals 304 and 316, PDFs 306 and 320, PEPs 308 and 318, and SIP proxies 310 and 314. In this embodiment, the functionality of user client portal 304, PDF 306, PEP 308 and SIP proxies 310 and 314 corresponds to the functionality of user client portal 104, PDF 106, PEP 108 and SIP proxy 110 as previously discussed with respect to FIG. 1. In this embodiment, the TCC system 300 further includes various communication links 305, 307, 309, 311 and 315, which provide signaling and SDP interrogation among the user client portals 304 and 316, the PDF 306, PEPs 308 and 318, and SIP proxies 310 and 314 and the user clients 302 and 312, and communication link 313 for a default media type (e.g., audio only) selected by the user client 302 or user client 312. The functionality of communication links 305, 307, 309, 311 and 313 corresponds to the functionality of communication links 305, 307, 309, 311 and 313 as previously discussed with respect to FIGS. 3 and 4. In this embodiment, another communication link 315 provides for signaling and SDP interrogation between SIP proxies 310 and 314 (e.g., domains FOO.com and XYZ.com). Similar to TCC system 300 illustrated in FIG. 4, this example also illustrates that the user client portals implicitly control the SDP firewalls 308 and 318 via the dialog with PDFs 306 and 320.

Figure 6:
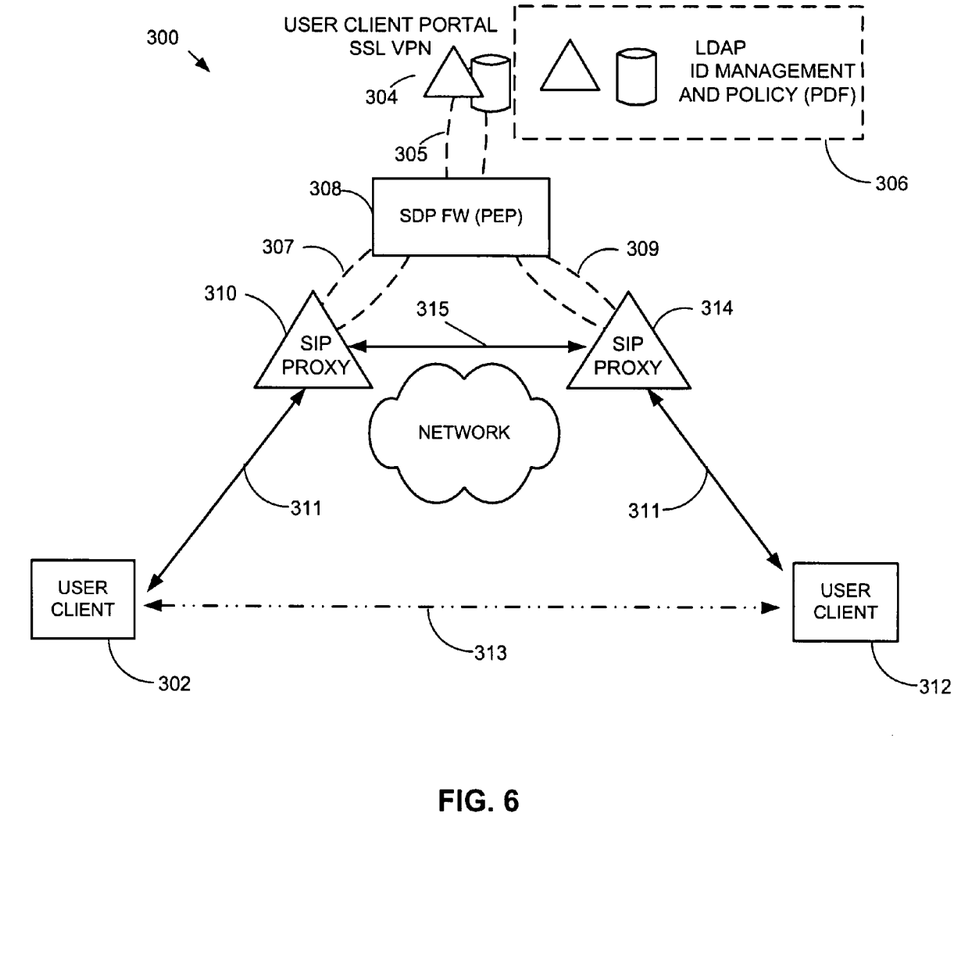
FIG. 6 is a block diagram of a trusted contextual communication system deployed within a SDP firewall host in accordance with the principles of the present invention.

FIG. 6 illustrates another embodiment of the trusted contextual communications ("TCC") system 300 deployed within a SDP firewall host. For example SIP proxy 310 could remain FOO.com and SIP proxy 314 could remain XYZ.com, a separate entity from FOO.com, as in FIG. 5, however, a third domain, PROTECTED.com has control over the user client portal 304, the IdM and Policy domains (PDF) 306 and the SDP firewall (PEP) 308. In this embodiment, the functionality of user client portal 304, PDF 306, PEP 308 and SIP proxies 310 and 314 corresponds to the functionality of user client portal 104, PDF 106, PEP 108 and SIP proxy 110 as previously discussed with respect to FIG. 1. The TCC system 300 further includes various communication links 305, 307, 309, 311 and 315, which provide signaling and SDP interrogation among the user client portal 304, the PDF 306, PEP 308 and SIP proxies 310 and 314 and the user clients 302 and 312, and communication link 313 for a default media type (e.g., audio only) selected by the user client 302 or user client 312. The functionality of communication links 305, 307, 309, 311 and 313 corresponds to the functionality of communication links 305, 307, 309, 311 and 313 as previously discussed with respect to FIG. 5. By placing the trusted contextual communication mechanism in the SDP firewall, a company (e.g., PROTECTED.com") can stop all incoming media communications from entering its communications network, and thereby provide a more secure communications network This embodiment provides for blackballing all requests from a domain that may be known to be major spamming domain.

Figure 7:
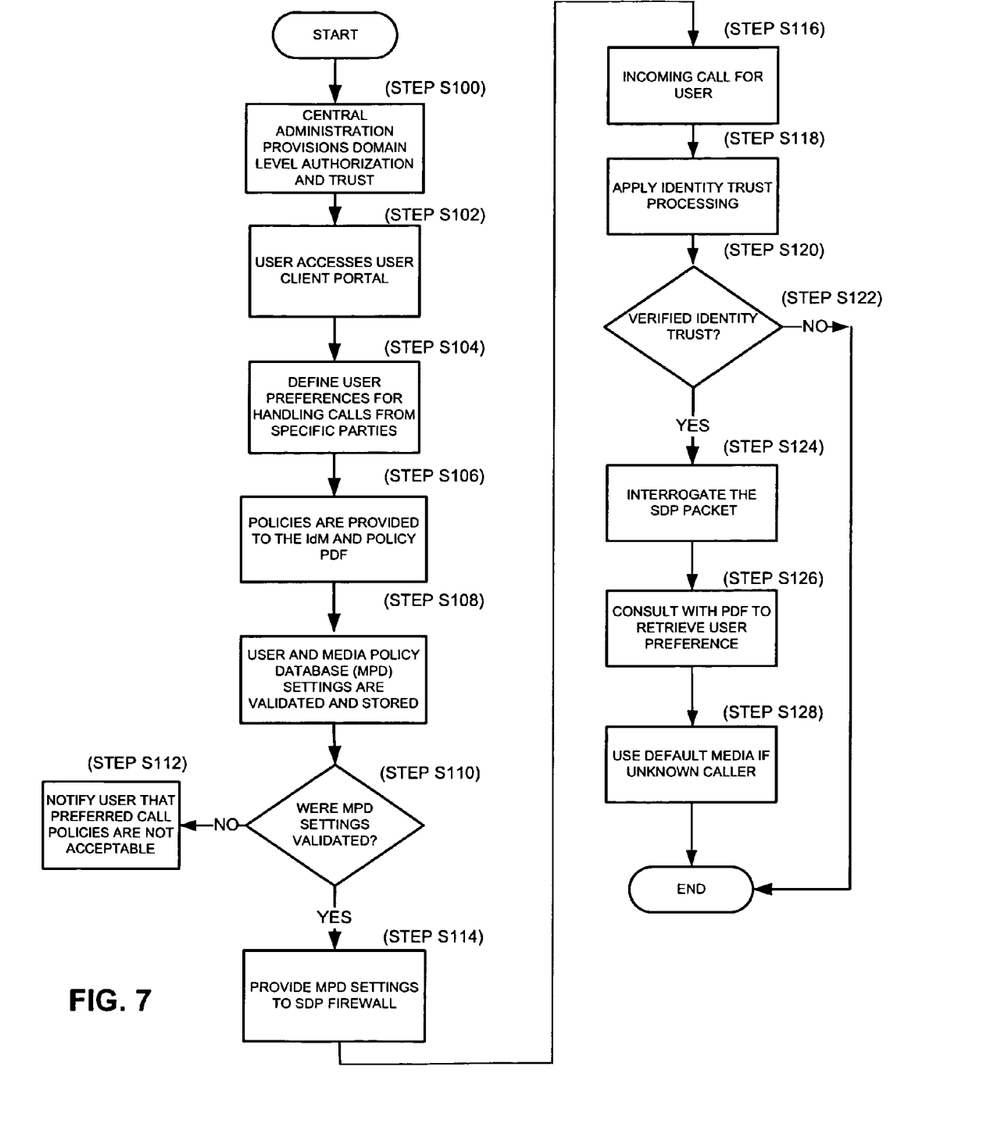
FIG. 7 is a detailed flowchart of an incoming media session process for trusted contextual communication in accordance with the principles of the present invention.

The operation of an embodiment of the trusted contextual communications system is discussed with respect to the flowchart of FIG. 7. In step S100, the central administration provisions domain level authorization and trust. In step S102, the user client 302 may access the user client or personal agent portal 304. The user client 302 may modify the allowed media and session types at the appropriate level by providing the user's preferences for handling calls from specific parties (step S104). For example, the user client 302 may modify the policies at the domain, group or user specific levels conditioned upon allowance by a central administrative policy manager. These modified user and corresponding media policy database ("MPD") settings or preferences are "pushed" or provided to the identification management ("IdM") and policy PDF 306 (at step S106) for approval and validation and storage in the central policy repository (step S108). At step S110, a determination as to whether the MPD settings (e.g., user client media policy preferences) were validated by the system. If not validated, the user client 302 is notified that the preferred MPD call policies were not acceptable (step S112). Otherwise, at step S114, the preferred MPD settings are provided or "pushed" to the SDP firewall 308.

At step S116, an incoming call for the user client 302 arrives, and the identity trust processing is performed. If the identity trust is not verified, then the incoming call request is terminated at step S122. Otherwise, the SDP packet is interrogated at step S124 and the PDF 306 is consulted and the specific media preference for that specific caller is used. In the event the caller is unknown, a default media (e.g., audio only) may be used (step S128). Additional steps may include optimizing the performance of multiple calling instances form the same known sources by introducing the concept of caching and tokens. For example, after a first time call, the SDP firewall or proxy may provide a token to a caller, in order for the caller to use next time they wish to call the user client. This means that the next time a call is made from the same caller, the SDP firewall or proxy will see the token and automatically allow the call for the proper media type based on previous policy establishment.

Figure 8:
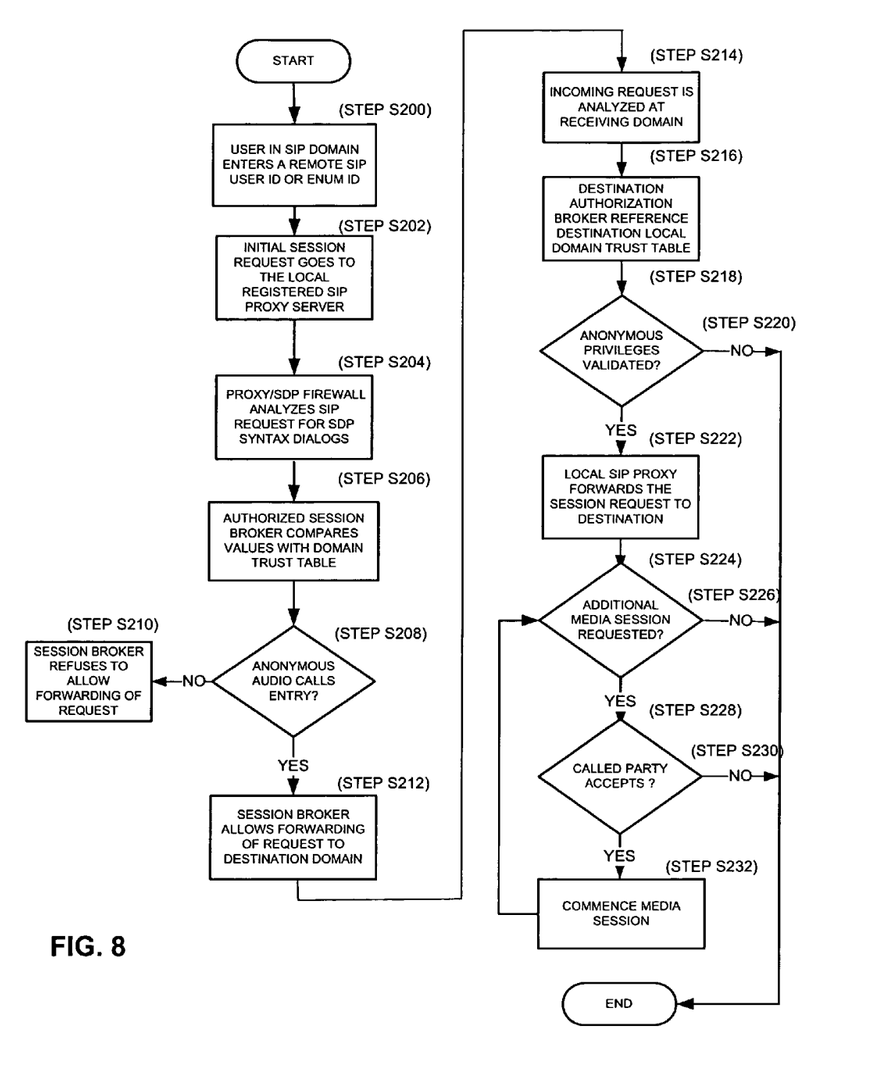
FIG. 8 is a detailed flowchart of an outgoing media session process for trusted contextual communication in accordance with the principles of the present invention.

The operation of an outgoing call from the trusted contextual communications system is discussed with respect to the flowchart of FIG. 8. In step S200, a user in the SIP domain enters a remote domain SIP user identification or telephone number mapping ("ENUM") identification and the initial request goes to the local registered proxy server 310 (step S202) where it is analyzed by the proxy service 310 or SDP firewall 308 (step S204) for SDP syntax dialogs that indicates the nature of the media session request. ENUM is a suite of protocols seeking to unify the telephone system with the Internet by using E.164 addresses with dynamic delegation discovery system ("DDDS") and domain name system ("DNS"). The proxies authorized session broker 306 compares the values with the domain trust table that exists within the trusted contextual communications system (step S206). At step S208, if the authorized session broker PDF 306 does not find the anonymous audio calls entry for the remote domain, the session broker PDF 306 refuses to allow the proxy to forward the request on to its destination domain (step S210). Upon finding the anonymous audio calls entry for the remote domain, the session broker PDF 306 then allows for the proxy 310 to forward the request on to its destination domain (e.g., XYZ.com) at step S212.

At the receiving domain, the incoming request is in turn analyzed (step S214) and its authorized session broker PDF 320 will reference its local domain trust table to validate anonymous privileges (step S216). At step S218, if the authorized session broker PDF 320 does not find the anonymous privileges valid, the session broker PDF 320 refuses to allow the proxy 314 to forward the request on to its ultimate destination (step S220). Upon validation the session broker PDF 320 will in turn allow for the local proxy 318 to forward the session request to its ultimate destination thereby completing the anonymous ring paradigm (step S224).

Once a communications media session has been established there may be a requirement for additional media sessions. At this point, the called party (e.g., user client 312) will be prompted by the authorization broker PDF 320 that such a request has been received (step S224). The called party (e.g., user client 312) then has the ability to accept or deny the request by the session broker intermediary PDF 320, not the calling party (step S228). If the called party does not accept the prompt for the session broker PDF 320, the actual session request is not forwarded by the local proxy 318 (step S230). Otherwise the local proxy 318 forwards the actual session request and the media session is commenced (step S232). Afterwards, a check may be made to determine if any additional media sessions have been requested (step S226). If no additional media sessions have been requested the media session may be terminated at step S226.

Although the invention has been described in the various embodiments with respect to SIP/SDP communications, it is applicable to any similar multimedia protocols and communications during a media session.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for providing trusted contextual communications on a communication network, the method comprising:
   defining user client media policy preferences, the user media policy preferences establishing the parameters for evaluating a media session request received by a user client, the media policy preferences specifying types of media allowable based on whether a level of use is one of a domain, group, and user level; and
   providing the user client media policy preferences to a policy enforcement point device, the policy enforcement point device evaluating the media session request received by the user client and applying the user client media policy preferences to the media session request.

2. The method of claim 1, wherein defining user client media policy preferences includes utilizing a user client portal to gain access to a media policy database, the media policy database providing storage for the user client media policy preferences.

3. The method of claim 1, wherein defining user client media policy preferences includes validating the user client media policy preferences.

4. The method of claim 3, wherein validating the user client media policy preferences includes storing the user client media policy preferences in a domain trust table.

5. The method of claim 1, further comprising receiving an incoming media session request for the user client.

6. The method of claim 5, further comprising applying identity trust processing to the incoming media session request for the user client.

7. The method of claim 5, further comprising interrogating a session description protocol data packet from the incoming media session request for the user client.

8. The method of claim 6, further comprising providing a token to a caller of the user client, the token providing an automatic media session connection.

9. A system for providing trusted contextual communications system on a communication network, the system comprising:
   a user client portal, the user client portal providing access to system media session policy preferences, the media session policy preferences being user client media policy preferences that specify types of media allowable based on whether a level of use is one of a domain, group, and user level;
   a policy decision function module, the policy decision function module providing identity management and media session policy modification to the trusted contextual communications system; and
   a domain trust table, the domain trust table storing the system media session policy preferences.

10. The system of claim 9 wherein the policy decision function module includes a policy enforcement point, the policy enforcement point device applying the media session policy preferences upon receipt of a media session request.

11. The system of claim 10 wherein the policy enforcement point is a session description protocol firewall, the session description protocol firewall applying the media session policy upon receipt of the media session request.

12. The system of claim 9 further including a session initiation protocol proxy device, the session initiation protocol proxy device capable of establishing connections between a first user client and a second user client.

13. The system of claim 9 further including a second policy decision function module, the second policy decision function module providing identity management and media session policy modification to the trusted contextual communications system.

14. A storage medium storing a computer program which when executed by a processing unit performs a method for providing trusted contextual communications on a communication network, the method comprising:
   defining user client media policy preferences, the user media policy preferences establishing the parameters for evaluating a media session request received by a user client, the media policy preferences specifying types of media allowable based on whether a level of use is one of a domain, group, and user level; and
   providing the user client media policy preferences to a policy enforcement point device, the policy enforcement point device evaluating the media session request received by the user client and applying the user client media policy preferences to the media session request.

15. The storage medium of claim 14, wherein defining user client media policy preferences includes utilizing a user client portal to gain access to a media policy database, the media policy database providing storage for the user client media policy preferences.

16. The storage medium of claim 14, wherein defining user client media policy preferences includes validating the user client media policy preferences.

17. The storage medium of claim 16, wherein validating the user client media policy preferences includes storing the user client media policy preferences in a domain trust table.

18. The method of claim 1, wherein a media type allowable at the domain level is voice media only.

19. The method of claim 1, wherein a media type allowable at the group level includes voice, video, and instant messaging only.

20. The method of claim 1, wherein a media policy preference allows web pushing and data collaboration at the user level only.

* * * * *